United States Patent [19]

Thomas et al.

[11] 4,444,702
[45] Apr. 24, 1984

[54] METHOD AND APPARATUS FOR PRODUCING EXTRUDED SECTIONS OF THERMOPLASTIC MATERIAL

[75] Inventors: Alfred Thomas, Hennef-Dambroich; Bruno Äpfelbach, Betzdorf, both of Fed. Rep. of Germany

[73] Assignee: Krupp Kautex Maschinenbau GmbH., Bonn, Fed. Rep. of Germany

[21] Appl. No.: 366,970

[22] Filed: Apr. 9, 1982

[30] Foreign Application Priority Data

Apr. 9, 1981 [DE] Fed. Rep. of Germany ....... 3114371

[51] Int. Cl.$^3$ ...................... B29D 23/04; B29C 17/07
[52] U.S. Cl. ............................... 264/40.1; 264/40.2; 264/40.7; 264/541; 425/140; 425/141; 425/381
[58] Field of Search ...................... 264/40.7, 167, 541, 264/40.1, 40.2; 425/141, 140, 381, 462, 467

[56] References Cited

U.S. PATENT DOCUMENTS

| | | | |
|---|---|---|---|
| 3,712,772 | 1/1973 | Hunkar | 425/381 |
| 3,795,719 | 3/1974 | Morecroft et al. | 264/541 |
| 3,865,528 | 2/1975 | Roess | 425/381 |
| 4,011,493 | 3/1977 | Fukase et al. | 425/381 |
| 4,038,011 | 7/1977 | Lemelson | 425/467 |
| 4,056,344 | 11/1977 | Lemelson | 425/462 |
| 4,159,293 | 6/1979 | Fukase et al. | 264/40.2 |
| 4,171,195 | 10/1979 | Klein et al. | 425/467 |
| 4,179,251 | 12/1979 | Hess et al. | 425/467 |
| 4,338,071 | 7/1982 | Daubenbuchel et al. | 425/532 |

FOREIGN PATENT DOCUMENTS 2533077 2/1977 Fed. Rep. of Germany ...... 425/140
2544609 4/1977 Fed. Rep. of Germany.

*Primary Examiner*—Jeffery R. Thurlow
*Attorney, Agent, or Firm*—Panitch, Schwarze, Jacobs & Nadel

[57] ABSTRACT

In the production of a tubular extruded section of thermoplastic material, the actual length of an extruded section at the end of the extrusion operation may be smaller or greater than the length of the extruded section which passed through the discharge orifice of the extrusion head during extrusion. If the wall thickness of the extruded section is varied during extrusion in accordance with a given program, inaccuracies in regard to distribution of the wall thickness over the length of the extruded section can be reduced by detecting the length of the extruded section which passes through the discharge orifice, and controlling the means for producing the programmed variation in wall thickness, in dependence on that discharge length. The same effect can be achieved by controlling the means for producing the programmed variation in wall thickness, in dependence on discharge speed and time. A higher degree of accuracy can be achieved by measuring the discharge length or discharge speed on the one hand and on the other hand the respective associated effective length of the extruded section, or the speed of movement of the free end of the extruded section, comparing those two detected values, and producing corrective variations in wall thickness in dependence on the result of the comparison operation.

24 Claims, 3 Drawing Figures

METHOD AND APPARATUS FOR PRODUCING EXTRUDED SECTIONS OF THERMOPLASTIC MATERIAL

BACKGROUND OF THE INVENTION

The invention relates generally to a method and apparatus for producing preferably tubular extruded sections, or parisons, of thermoplastic material, by extrusion of the thermoplastic material from an extrusion head into which the plastic material is fed through an inlet orifice and from which it is discharged through an extrusion or discharge gap, the wall thickness of the extruded section being varied during extrusion in accordance with a given program.

Extruded sections of this kind may be used as parisons which are subsequently expanded in a further working operation, and processed to form a finished article, for example a bottle or flask, cask, tank or the like. When manufacturing tubular extruded sections, the outlet or discharge orifice is in the form of an annular gap. Since this manufacture is the most frequently encountered situation of use in practice, this specification generally refers hereinafter to the production of a tubular extruded section, using an annular discharge gap. It will be appreciated however that the invention is also applicable to extruded sections which are of a different cross-sectional shape, for example in connection with extruding extruded sections of strip-like or sheet-like form, in which respect different cross-sectional shapes are also possible.

It has been found that the actual length of an extruded section at the end of the extrusion operation is normally shorter or longer than the length of the extruded section which had passed through the discharge orifice of the injection head during the extrusion operation. That length, which is referred to hereinafter as the 'discharge length' can be measured directly, for example using a roller which is rotated by the movement of the extruded section. However, it is also possible for the discharge length to be calculated from the speed at which the extruded section issues from the discharge orifice, and the time required for extrusion from the extrusion head of all the material forming the finished extruded section.

Variations in respect of the actual length of the extruded section at the end of the extrusion operation, in relation to the discharge length, can arise for various reasons. Thus, many thermoplastic materials have a pronounced property due to a memory effect, which results in shrinkage of the extruded section after it leaves the extrusion head, with the consequence that the actual length of the extruded section at the end of the extrusion operation is less than the discharge length. Tests have shown that the discharge length may be up to 1.8 times, and even more, the effective final length of the finished extruded section. In this connection, the forces acting on the extruded section after it leaves the extrusion head, due to the above-mentioned memory effect, very widely. They depend more particularly on the discharge speed, pressure and temperature in the system comprising the extruder and the extrusion head, the fluctuations in cross-section which the material experiences during the extrusion operation, and properties of the material. With regard to the latter consideration, account must even be taken of the fact that, when using the same material, the forces due to the memory effect may vary from one charge batch to another.

As the weight of the extruded section which hangs down from the extrusion head during the extrusion operation counteracts the forces due to the memory effect, the length and the weight of the extruded section also play a part in regard to the difference which arises between the discharge length and the effective length. The shrinkage phenomenon which is caused by such forces occurs relatively quickly after the extruded section leaves the extrusion head so that such shrinkage is no longer very great, shortly after the extruded section passes through the discharge orifice. In this respect, it should also be noted that the effect of such forces due to a memory effect decreases with increasing length of extruded section because, as already stated above, the weight of the extruded section increases with length, and the weight of the extruded sections counteracts such memory-effect forces. At any event, the effect of the forces due to a memory effect normally varies over the length of the extruded section.

Polyolefins in particular have a pronounced memory-effect property, although such property is not limited to those synthetic materials. On the other hand, there are synthetic thermoplastic materials which, when extruded, experience an increase in length during the extrusion operation so that the effective final length of a completed extruded section is greater than the discharge length. This increase in length of the extruded section during the extrusion operation is essentially to be attributed to the fact that, after the material leaves the extrusion head, it flows downwardly within the extruded section, in particular under the effect of the weight of the material itself. In this connection, it is to be assumed that the extruded section is normally extruded in a vertically downward direction. In this case also the discharge speed, pressure and temperature in the system comprising the extruder and the extrusion head, the properties of the synthetic material to be processed, and the weight of the extruded section, are essential factors in regard to the magnitude of the increase in length of the extruded section, which may vary from one extruded section to another, as was noted hereinbefore in regard to the memory-effect property of other synthetic resin materials. Typical synthetic resin materials which undergo an increase in length while being extruded are cellulose acetate and PVC, although it will be noted that this is not a complete list.

The fact that the extruded sections may be of different lengths, when using the same volume of material and the same size of discharge orifice in the extrusion head, is referred to in German Offenlegungsschrift No. 25 44 609 which describes an apparatus for eliminating or at least substantially reducing the variations in the final length of the extruded section.

It is also known for the width of the gap forming the discharge orifice of the extrusion head to be varied in accordance with a given program, during the extrusion operation, in order thereby to influence and control the wall thickness of the extruded section. This arrangement is intended to adapt the wall thickness of the finished product, for example a container which is to be blow-moulded from the extruded section in a hollow mould, to the respective requirements involved in that operation. For example, such requirements may be that the regions of the extruded section which are expanded to the greatest degree in the hollow mould under the effect of the pressure medium, which is generally gaseous, are of greater wall thickness so that they are still of sufficient wall thickness in the final product, after the blow-moulding operation has been concluded. However, producing the desired effect, namely producing predetermined wall thicknesses in given regions of the final product, presupposes that on the one hand the distribution in respect of the wall thickness in the extruded section corresponds to the wall thickness distribution in the subsequent final article, and on the other hand an extruded section which is provided with such a varying wall thickness also occupies the proper position relative to the blow-mould. The above-mentioned fluctuations in respect of the length of the extruded section therefore make it difficult to achieve a precise correlation or association between the program in respect of the wall thickness, and the extruded section itself, as generally the width of the discharge gap is adjusted in dependent on control parameters which take no account of the difference between the discharge length of the extruded section on the one hand, and the effective final length thereof, on the other hand.

Thus, it is known for the programming means for programming the variation in wall thickness to be controlled in dependence on the moement of the free end of the extruded section. It will be seen from the introductory explanation set out hereinbefore that the reduction in length which is caused in many plastic materials by the visco-resilient properties thereof and the resulting behaviour due to a memory effect of the plastic material, or the increase in length which occurs in other plastic materials during the extrusion operation has the effect that the movement of the free end of the extruded section does not normally correspond to the discharge speed of the extrusion when passing through the discharge orifice so that from the very beginning, for example when there is a constant spacing between the switching points in the programming device, which switching points produce a change in the width of the discharge orifice or change the direction in which the width of the discharge orifice varies, the corresponding points on the extruded section are disposed at unequal spacings from each other. Such spacings can also be additionally influenced at a later time in the process, by the changes in the length of the extruded section after passing through the discharge orifice, due to the viscoelastic behaviour of the material or the increase in length of the extruded section. In other words, on the one hand, applying the wall thickness program to the extruded section in regard to the variations in wall thickness over the length of the extruded section is based on incorrect presumptions, and in addition, after the wall thickness program has been applied to the extruded section, reductions or increases in the length of the extruded section may additionally influence the distribution in respect of wall thickness over the longitudinal extent of the extruded section.

Even when the programming device which programs the variations in wall thickness is controlled in dependence on other parameters, for example in dependence on time, or, when using accumulator extrusion heads, in dependence on the movement of a piston for urging the plastic material out of the accumulator chamber, it is not possible to achieve a better result, as in such cases also distortion in respect of the distribution of wall thickness over the length of the extruded section is inevitable, due to the above-mentioned factors which influence the wall thickness of the extrusion.

SUMMARY OF THE INVENTION

An object of the invention is to provide a method and apparatus for producing a preferably tubular extruded section, which overcomes the above-discussed disadvantages.

Another object of the invention is to provide such a method and apparatus, which provides for better control of the dimensional accuracy of the extruded length.

Yet another object of the invention is to provide a method of producing a parison, which permits more accurate distribution of the wall thickness over the parison.

Still another object of the invention is to provide a method and apparatus for producing a parison, which permits more accurate association between the parison and the mould cavity of a mould in which the parison is blow-moulded.

These and other objects are achieved by detecting the length of the extruded section which passes through the discharge orifice, referred to as the discharge length, and controlling the means for producing the variation in wall thickness of the extrusion, in dependence on the discharge length.

This procedure has the effect that the wall thickness program is applied to the extruded section in a substantially more accurate manner than when using previously known processes, as the parameter referred to as the 'discharge length' is at least substantially unaffected by shrinkage or increases in length.

In the method in accordance with the present invention, the discharge length is preferably measured directly at the discharge orifice or at a spacing therefrom which is so short that either the above-mentioned distortion phenomena cannot occur, or, if such distortion phenomena do occur, then they are not of any significant extent.

This also applies in connection with an alternative form of the method wherein the speed of the extruded section on issuing from the discharge orifice is detected and the distribution in respect of wall thickness, over the length of the extruded section, is controlled in dependence on the discharge speed and time.

The above-depicted forms of the method can provide a considerable improvement over the prior art, as the application of the program in respect of wall thickness, to the extruded section, is at least substantially free from distortion as discussed above.

In addition however, the present invention also envisages the possibility of reducing the distortion in the program-dependent distribution of wall thickness, which distortion occurs after the wall thickness program has been applied to the extruded section. In accordance with a further aspect of the present invention, this can be achieved by a procedure which provides that the discharge length of the extruded section on the one hand and the respective effective length of the extruded section on the other hand are measured, the two values are compared together, and operating parameters of the extrusion apparatus are additionally controlled in dependence on the result of the comparison operation, in order if necessary to produce additional variations in respect of wall thickness, so that the distribution of wall thicknesses over the length of the extruded sections is of maximum uniformity, from one extruded section to another. It is assumed in this respect that, as normally there will always be a difference between the discharge length and the effective length, the normal behaviour of the material to be processed is ascertained under given circumstances at the beginning of a program for producing given extruded sections, such normal behaviour also including a given difference between the discharge length and the effective length. This is taken as the desired or reference value throughout the duration of the program so that the comparison between the discharge length and the effective length serves to keep deviations from that reference value to a minimum amount.

Accordingly, this means that, with equal spacings between the switching points of the programming means, the points on the extruded section, which correspond to those switching points, are disposed, relative to the discharge length of the extruded section, at spacings which are then 'distorted' to relatively equal spacings in the course of the reductions or increases in length which occur after the extruded section passes through the discharge orifice, whereby the points or positions corresponding to the switching points of the programming means are so disposed on the extrusion that each extruded section, or the distribution in respect of wall thickness, in particular over the length thereof, is disposed in at least approximately the proper relative position with respect to the mould cavity of the blow-mould in which further processing is effected.

It is particularly advantageous that the above-mentioned proper relative position can be reproduced from one extruded section to another, with a degree of accuracy which is markedly better than in the known methods.

In this case also, instead of detecting the discharge length and the effective length, it is possible to detect the discharge speed and the speed at which the free end of the extruded section moves past and therefore away from the extrusion head, during the extrusion operation. In this connection, it will normally not be necessary to take particular account of the changes in speed which are caused by variations in the width of the discharge gap, as such variations in speed affect both the discharge speed and also the speed at which the free end of the extruded section moves past the extrusion head.

The means used for applying or producing the variation in wall thickness or distribution in respect of wall thickness can be adjusted on the basis of the above-mentioned, empirically established normal behaviour, in such a way that when the program is applied to the extruded section, the subsequent shrinkage or increase in length thereof is taken into account whereby, after shrinkage or an increase in length has occurred, the program assumes its desired or reference position on the extruded section, that is to say, for example, with equal spacings between the points on the extruded section which correspond to the switching points of the programming means. The smaller that changes in the difference between the discharge length and the effective length or the discharge speed and the speed of the free end of the extruded section can be made, the more accurate and precise is the distribution in respect of wall thickness on the extruded section.

For this purpose, the invention provides that, in order to influence the length of the extruded section, the width of the discharge orifice is varied in dependence on the result of the comparison operation, in respect of length and/or speed, with the aim of keeping the effective length of the extruded sections as constant as possible. In other words, the variations in the width of the discharge orifice, which are produced in dependence on the set program in respect of wall thickness, has a further variation superimposed thereon, whereby the wall thickness which is produced on the basis of the program is proportionally increased or reduced in order to distribute a given volume of material over a longer or shorter extruded section. A mode of operation of this kind is known from above-mentioned German Offenlegungsschrift No. 25 44 609, in an extrusion head with an accumulator chamber from which successive extruded sections are extruded in a batch-wise procedure. However, in accordance with a further feature of the invention, a procedure of that kind can also be carried out to advantage in the continuous extrusion of the successive extruded sections, with the result that the volumes and weights of the individual extruded sections fluctuate much less than is the case in the known processes, although continuous extrusion does not afford the possibility of establishing the volume of the individual extruded sections within very close limits, by virtue of storing the corresponding amount of material in an accumulator chamber.

Another possibility is that the length of the wall thickness program may be varied, to adapt it to changes in the relationship between the discharge length and the effective length or the discharge speed and the effective speed of the free end of the hollow extruded section, in dependence on the result of the comparison operation in respect of lengths and/or speeds. In other words, the length over which the wall thickness program is called up, is increased or reduced. In the first case, the spacing between two successive points on the extruded section, which corresponds to the spacing between two successive switching points of the programming means is longer, while in the second case it is shorter.

DESCRIPTION OF PREFERRED EMBODIMENTS

Figure 1:
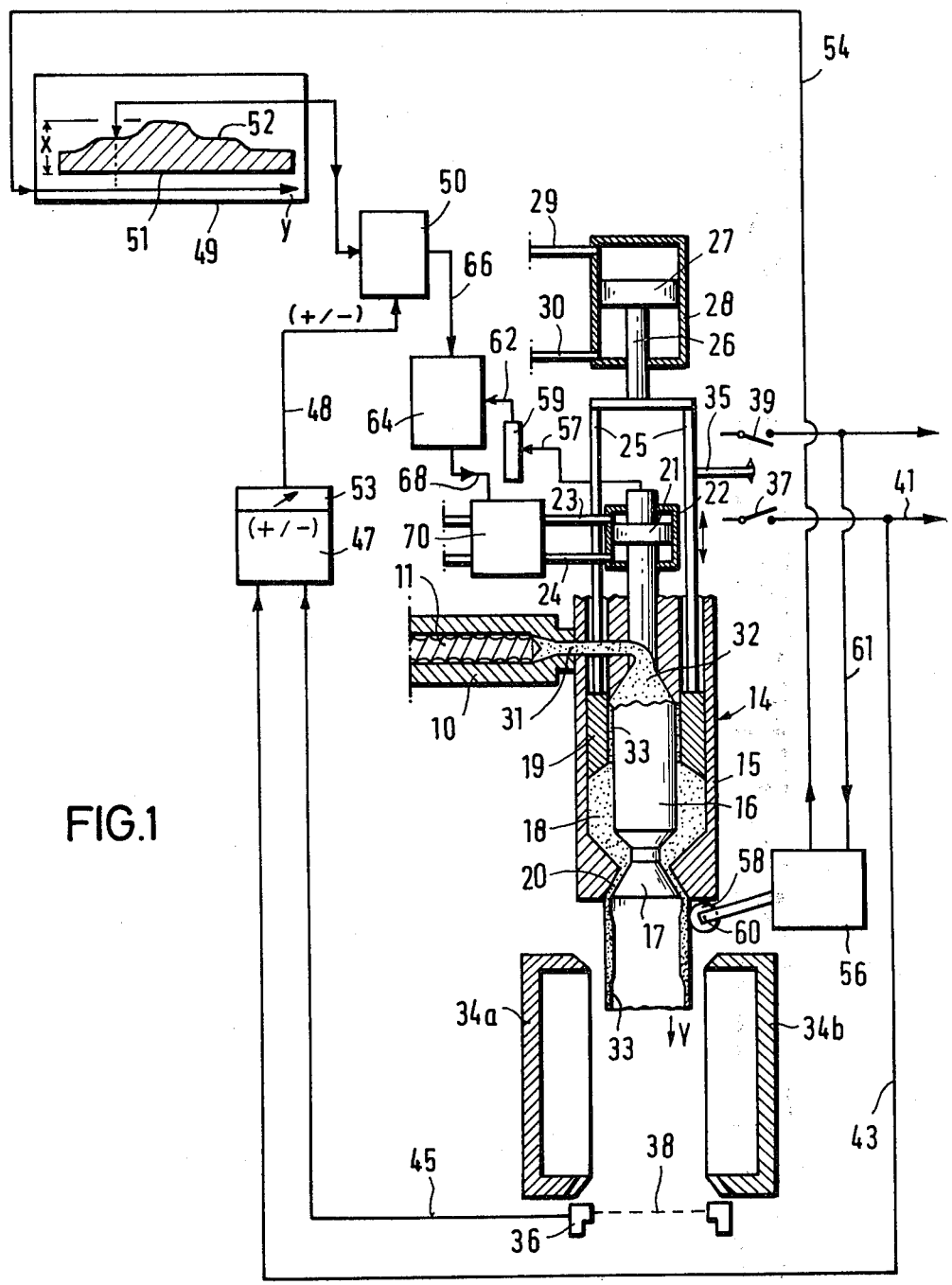
FIG. 1 shows a diagrammatic view of an extrusion blow moulding apparatus, the extrusion head of which is in the form of an accumulator head.

Referring firstly to FIG. 1, apparatus for producing hollow members of thermoplastic material by an extrusion blow moulding method comprises an extruder 10 having a screw 11 driven by a motor (not shown). Thermoplastic material is introduced into the extruder 10 in the form of granular material or in some other suitable form. Connected downstream of the extruder 10 is an extrusion head 14 which substantially comprises a housing 15, a stationary mandrel 16, a core 17 which is arranged coaxially and axially displaceably therein, and a piston 19 which is in the form of an annular piston. The piston 19 is also axially reciprocable in the region of an accumulator chamber 18. At its lower end, the core 17 represents the inner limit of an extrusion or discharge orifice 20 which is in the form of an annular gap. In its upper terminal region, the core 17 is provided with a piston 21 which is displaceable in a cylinder 22. The feed and discharge lines for the pressure fluid, which is normally hydraulic fluid, are denoted by reference numerals 23 and 24.

The piston 19 is connected to the piston rod 26 of a piston 27 by means of bolts 25 which are distributed over the periphery of the piston 19. The piston 27 is displaceable in a cylinder 28. Feed and discharge lines 29 and 30 are provided for the pressure fluid which is generally hydraulic fluid.

The housing 15 of the extrusion head 14 is provided with an inlet orifice 31 for the thermoplastic material, which is put into an annular cross-sectional configuration by way of two oppositely disposed, downwardly flared channels or ducts 32. The material flows by way of the intermediate channel or duct 33 into the accumulator chamber 18, and thus displaces the piston 19 upwardly into its upper limit position. The construction of the extrusion head in this respect may be the same as the disclosure of German Offenlegungsschrift No. 17 04 791 and U.S. Pat. No. 3 611 494.

Disposed below the extrusion head 14 is a blow mould which comprises two mould halves 34a and 34b and which has associated therewith a conventional means (not shown) for the feed of a pressure fluid for expanding the parisons which are accommodated by the blow mould 34a, 34b, in the form of the tubular extruded sections 33, until they come to bear against the inside surface of the closed blow mould 34a, 34b.

In operation of the apparatus, the material which is plasticised in the continuously operating extruder 10 initially passes through the inlet orifice 31, the channels 32 and the intermediate channel 33 into the annular accumulator chamber 18. As the accumulator chamber 18 is progressively filled with material, the piston 19 is displaced from its lower limit position upwardly into its upper limit position. As soon as the piston 19 has reached its upper position, which is adjustable, the piston 27 is subjected to fluid pressure by way of suitable known means through the line 29, whereby the piston 19 is displaced downwardly into its lower limit position. When this occurs, the thermoplastic material in the accumulator chamber 18 is extruded through the discharge orifice 20 in the form of a tubular hollow extruded section or parison 33, more particularly, between the two mould halves 34a and 34b of the blow mould which at that time is at least partly open. Then, triggered by control pulses, the production of which will be described hereinafter, the blow mould is closed around the parison 33. The parison is then expanded, using the above-mentioned pressure fluid.

All these possible features and steps are known so that they do not need to be described in greater detail herein. After the operation of expanding the parison, the resulting hollow member remains within the blow mould 34a and 34b for a given period of time which is required for the thermoplastic material to sufficiently cool down and set. The mould is then opened. The finished hollow member on which there are generally still some flash portions, is removed from the blow mould so that the mould is now available for accommodating the next following parison or extruded section 33.

Disposed below the blow mould at a small distance therefrom is a photoelectric cell 36. The photoelectric cell 36 is so arranged that the light barrier 38 associated therewith is broken by the lower end of the parison 33 as soon as the parison 33 reaches its desired or reference length. Also associated with the piston 19 is a position indicator member 35, the movements of which are dependent on the movements of the piston 19. The position indicator member 35 is capable of triggering signals by way of signal generators 37 and 39, in the two limit positions of the piston 19. In the lower position of the piston 19 and thus of the position indicator member 35, the position indicator member 35 actuates a signal generator 37 so as to trigger a signal which indicates that the downward stroke movement of the piston 19, for causing extrusion of the material in the accumulator chamber, that is to say, the stroke movement of the piston 19 towards the discharge orifice 20, and thus also the step of forming the parison 33, are concluded. This signal from the signal generator 37 is passed by way of a line 41 to a means (not shown) for closing the blow mould 34a, 34b around the parison 33.

In addition, the photoelectric cell 36 and the signal generator 37 are each connected by way of a respective line 45 and 43 to a comparison means 47. The comparison means 47 determines whether the light barrier 38 is or is not interrupted by the parison 33 at the moment at which the position indicator member 35 and thus the piston 19 reached the position at the end of the extrusion stroke movement of the piston 19. If the comparison means 47 receives a signal from the photoelectric cell 36, that means that the parison 33 is longer than its predetermined reference or desired length. In the opposite case, when the photoelectric cell 36 does not produce a signal, the parison 33 is too short. In each of those two cases, the comparison means 47 applies a signal by way of a line 48 to an adjusting means 50 which is connected to the output of a programmer 49. A given program is set in the programmer 49, in regard to distribution in respect of wall thickness of the parison 33 over the length thereof. The respective value x between the line 51 and the curve 52 corresponds to the width of the discharge gap 20 and thus the wall thickness of the resulting parison 33 over the length thereof, which corresponds to the length y in the programmer 49. In other words, the curve 52 shows the pattern or distribution in respect of wall thickness, over the length of the parison 33.

The program which is set in the programmer 49 in accordance with the curve 52, in respect of the wall thickness of the parison 33, is executed in the embodiment shown in FIG. 1 in dependence on the length of the extruded section passing through the discharge or extrusion gap 20. That dependency is produced by way of a line 54 which connects a conversion member 56 to the programmer 49. A wheel 58 or the like is mounted rotatably about an axis 60 at the lower end of the extrusion head 14, directly below the discharge orifice 20, in such a way that the wheel 58 or the like bears against the outside wall surface of the parison 33 and is set in rotation thereby as the parison 33 is extruded or moved downwardly. In other words, the number of revolutions of the roller or wheel 58 depends on the length of the hollow extruded section, as measured at the moment that the extruded section issues from the extrusion gap 20. A similar situation also applies in regard to the speed of discharge of the extruded section and the speed of rotation of the wheel or roller 58. The values which are detected by the roller 58, that is to say, either the length or the speed of the hollow extruded section, are converted in the conversion means 56 into suitable electrical signals which are introduced by way of the line 54 into the programmer 49 in which the program in respect of wall thickness, as indicated by curve 52, is executed in dependence on the discharge length or the discharge speed, along line y.

In this respect, the signal generator 39 also serves inter alia to switch on the conversion means 56, by way of the line 61, when the piston 19 reaches its upper limit position, which coincides with the beginning of the extrusion stroke movement and thus extrusion of the parison 33.

The alteration in wall thickness in accordance with the set program as indicated by curve 52 is effected by way of axial displacement of the core 17. It will be seen from FIG. 1 of the drawings that movement of the core 17 in a downward direction results in an increase in the width of the discharge gap 20, while movement of the core 17 in an upward direction results in a reduction of the width of the discharge gap 20.

For the purposes of actuating the core 17 in dependence on the set program 52 in respect of wall thickness, associated with the piston 21 is a position indicator member 57 which co-operates with a position signalling means 59 which is for example in the form of a potentiometer. The position signalling means 59 is connected by way of a line 62 to a controlling means 64 which in turn is connected by way of lines 66 and 68 respectively, to the programmer 49 and to a servo valve 70 which is disposed on the lines 23 and 24. The controlling means 64 compares the actual position of the core 17, as detected by the position indicator member 57 and the position signalling means 59 or the like, to the desired or reference position of the core 17, which is determined on the basis of the curve 52 of the programmer and a further control parameter which is introduced into the matching or compensating means 50 by way of line 48, in the form of a signal from the comparison means 47. That signal indicates whether the parison 33 is too long or too short. Depending on the respective situation obtaining, the respective value in respect of the width of the discharge gap 20, which comes from the programmer in accordance with the configuration of the curve 52, is combined in the device 50 with a given value. If the photoelectric cell 36 has detected that the parison 33 is of excessive length, the value in respect of the width of the discharge gap 20, which is produced by the programmer 49, is increased somewhat in the device 50, whereby the total wall thickness of the following parison 33 is somewhat greater, with the necessary result of a corresponding reduction in the length of the parison 33, because the volume thereof is in essence determined by the volume of the accumulator chamber 18. Although material is also supplied from the extruder 10 into the extrusion head 14 during the extrusion stroke movement and thus during the operation of forming the parison 33, so that fluctuations in the extruder output can influence the amount of material and thus the length of the parison 33, such fluctuations can be compensated by suitable steps which are described for example in German Offenlegungsschrift No. 25 44 609.

Instead of using the photoelectric cell 36 and the light beam or barrier 38 associated therewith, this being an arrangement which can alternatively detect only two operating states, it is readily possible to use other arrangements which are capable of detecting and distinguishing between ranges in respect of length, so that it is possible to provide a tolerance range or the like with regard to the length of the parison 33, whereby, as long as the length of the parison 33 is within that tolerance range, there is no change in the width of the discharge gap, by way of the comparison means. It is only when the length of the parison falls below or goes above the limits of the above-mentioned tolerance range that the width of the discharge gap 20 is altered in one direction or the other, in the above-described manner.

Figure 2:
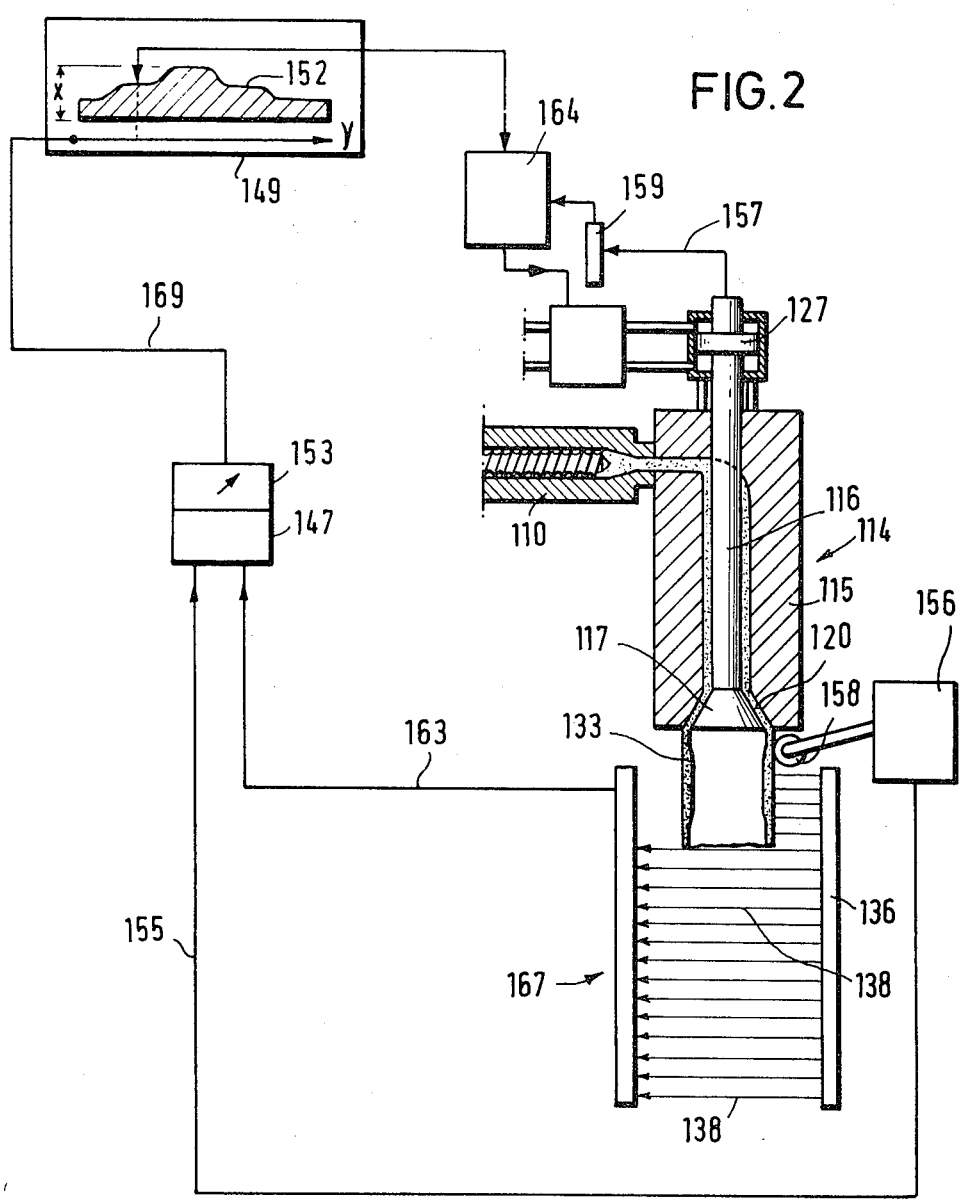
FIG. 2 shows an extrusion blow moulding apparatus with continuous extrusion of extruded sections.

Reference will now be made to FIG. 2 showing an embodiment wherein parts which are identical to the components of the embodiment shown in FIG. 1 are denoted by the same reference numerals, but with the increase of 100. Connected to the output of the extruder 110 is an extrusion head 114 from which the thermoplastic material is continuously extruded through an annular discharge orifice 120, in the form of a hollow extruded section or parison. The wall thickness of the parison 113 is also controlled, in dependence on a program stored in the programmer 149, by axial displacement of a mandrel 116 which is arranged in the extrusion head 114 and the lower portion of which serves as a core 117 to define the inner limit or surface of the discharge orifice 120. By virtue of the conical configuration of the core 117 and the oppositely disposed wall portions of the housing 115, axial displacement of the core 117 produces in the usual manner an increase or a reduction in the width of the discharge gap or orifice 120.

Similarly to the embodiment illustrated in FIG. 1, a position indicator member 157 is associated with the piston 127 which produces the axial movement of the mandrel 116. The position indicator member 157 co-operates with a position signalling means 159 which is formed for example as a potentiometer. In other respects, the FIG. 2 configuration corresponds to the embodiment shown in FIG. 1, except that the controlling means 164 is connected to the output of the programmer 149 without the interposition of a matching or compensating means.

The conversion means 156 which is connected downstream of the wheel or roller 158 for measuring the discharge length or discharge speed of the parison 133 is connected by way of a line 155 to a comparison means 147 which has an adjusting means 153 connected to the output thereof. A further line 163 forms a connection between a means 167, which is disposed below the extrusion head 114, for detecting the effective length of the parison 133 or the effective speed at which the free end of the parison 113 moves during the extrusion operation, and the comparison means 147. The detection means 167 may comprise a plurality of photoelectric cells 136 which are disposed one above the other and the light barriers or paths 138 of which cover the region through which the parison 133 moves, until it reaches its condition of maximum length. Thus, at any moment during the extrusion operation, in the course of a working cycle, the effective length of the portion of the parison 133 which is hanging from the extrusion head 114 at that moment can be detected with a degree of accuracy which corresponds to the spacing between two adjacent light paths or barriers 138. The speed at which the successive light barriers 138 are interrupted in a downward direction by the lower free end of the parison 133 during the extrusion operation gives a sufficiently accurate indication as to the speed at which the free end of the parison 133 is moving downwardly, until it has reached its reference or desired position, and the blow mould which is not shown in FIG. 2 for the sake of simplicity of the drawing closes around the parison.

In the embodiment shown in FIG. 2, it is assumed that, when there are given operating parameters corresponding to the usual operating condition of the system comprising extruder 110 and extrusion head 114, in connection with a thermoplastic material with given properties, there are also given relationships, which fluctuate only within narrow limits, between the discharge length or discharge speed of the parison 133 as measured by the wheel 158, on the one hand, and the respectively associated effective length of the parison 133 or the speed at which the free end of the parison 133 moves in a downward direction. Those relationships which may vary in a given manner during the extrusion operation, as the length of the parison increases, are inputted into the comparison means as an average value, to constitute a presetting thereof. A change in the above-mentioned relationships causes triggering of a signal which increases or decreases in dependence on the direction in which the relationships alter. Consequently, this means that the length of the program y corresponding to the curve 152, in respect of the discharge length of the parison 133, is either increased or reduced so that, in the event of deviations from the predetermined relationships between the discharge length and the effective length of the parison, the points or planes corresponding to the switching points of the programmer 159 are distributed, on the parison 133, in such a way that they take up the correct relative position on the parison which is of the desired or reference length. In this respect, the parison 133 can normally be assumed to be of its reference length as the blow mould is always closed around the parison at the moment when the parison has reached its reference length. This can be established without difficulty, as also in the embodiment shown in FIG. 1, by a light barrier which is arranged at a given level and which will generally be the lowermost light barrier. In other words, the absolute value in respect of the discharge length will always vary, in relation to the fixed value of the effective reference length. When the relationship between the discharge length and the effective length, which occurs under normal operating conditions, is for example 1.8:1, an alteration in the discharge length to a value of 1.7 would result in a reduction in the length of the program in respect of wall thickness, as for example, when using a programmer having ten switching points, the respective next switching point would have to be triggered not after 18 cm but after 17 cm of the discharge length of the extruded section. Conversely, in the event of an increase in the absolute value of the discharge length, the length y of the program corresponding to the curve 152 is increased so that the next following switching point of the programmer is triggered after for example 19 cm of the discharge length. The signals for causing the increase or reduction in the length y of the program are introduced into the programmer 149 by the adjusting means 153, by way of line 169.

Figure 3:
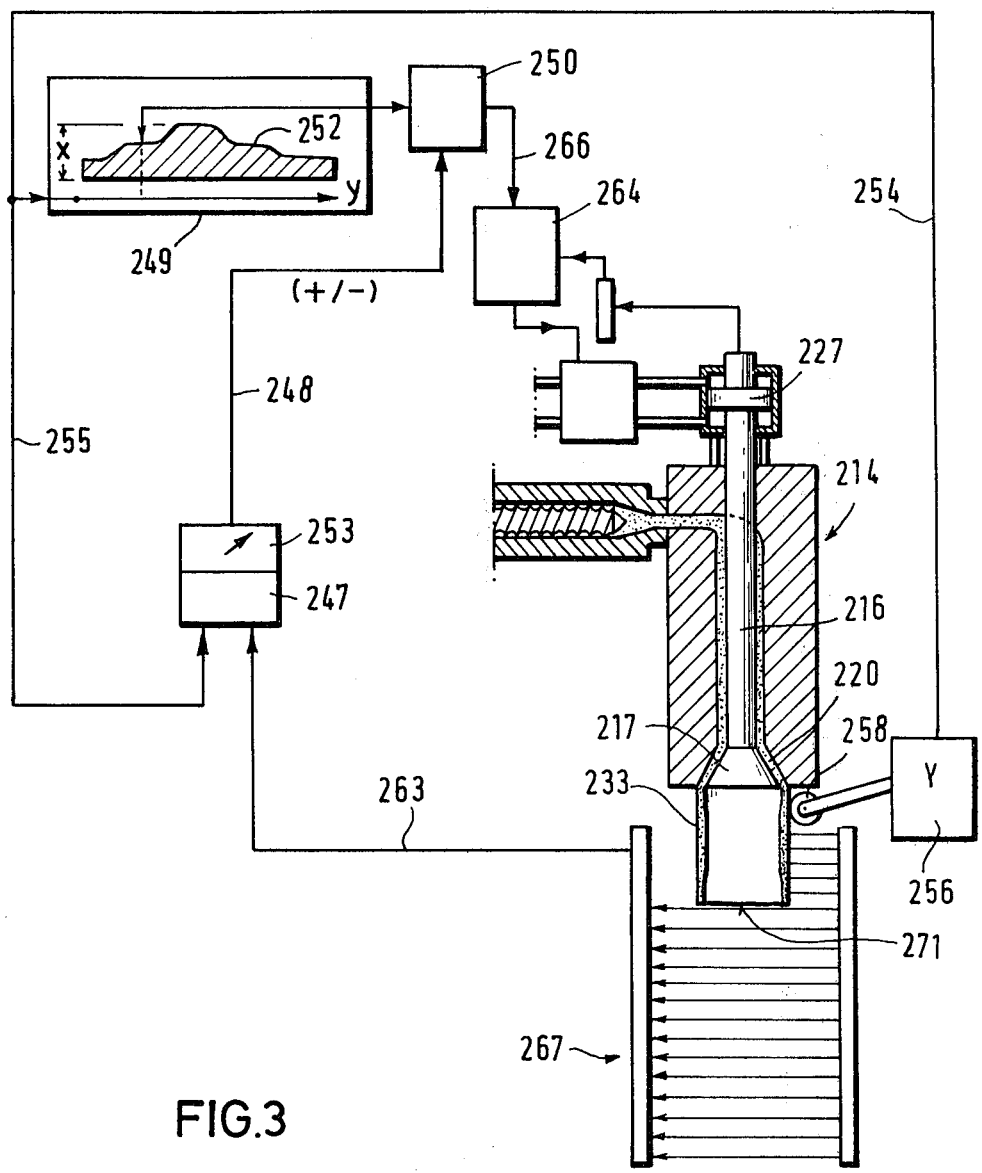
FIG. 3 shows a view, corresponding to FIG. 2, of a further embodiment.

The embodiment shown in FIG. 3 also concerns an apparatus wherein the parison 233 is continuously extruded from the extrusion head 214. Parts in FIG. 3 which are the same as those used in the embodiment shown in FIG. 2 are each denoted by the same reference numeral, but increased by 100.

The embodiment shown in FIG. 3 provides the possibility of adjusting the width of the discharge orifice or gap 220, for the purposes of regulating the volume of material forming the parison 233. For that purpose, the conversion means 256 which converts the discharge length or discharge speed, which is detected by the wheel 258, into pulses or other suitable signals, is connected, similarly to the embodiment shown in FIG. 1, by way of a line 254 to the input of a programmer 249 providing a program in respect of wall thickness, in accordance with the configuration of the curve 252. The signals or the like coming from the conversion means 256 are applied by way of a line 255 to a comparison means 247 which is also connected by way of a line 263 to a means 267 which, as in the embodiment shown in FIG. 2, detects the effective length of the parison 233 during the extrusion operation, or the speed at which the free end 271 of the parison 233 is moving downwardly during the extrusion operation.

The comparison means 247 is connected by way of a line 248 to a matching or compensating means 250 which, similarly to the embodiment shown in FIG. 1, is connected to the output of the programmer 249. The means 250 is connected by way of a line 266 to a controlling means 264 and further means which are disposed downstream thereof and which are the same as those used in the embodiment shown in FIGS. 1 and 2 and which are provided to control the axial movement of the mandrel 216 and the core 217 thereof.

This embodiment also is based on a given relationship between the discharge length of the parison 233 and an effective final length, which is set in the comparison means 247. Deviations from that basic relationship result in the output of a signal with a positive sign or a negative sign on the line 248 to the means 250, depending on the direction in which such deviations occur. As in the embodiment shown in FIG. 1, the function of the means 250 is to allow the respective value coming from the programmer 249, relating to the width of the discharge orifice or gap 220, to pass unaltered when there is a zero signal from the comparison means 247, which indicates that the arrangement is operating in accordance with the set relationship or, when there is a deviation from that set relationship, the means 250 increases the value corresponding to the width of the discharge orifice 220, in such a manner as to increase or reduce the x value. The former will be the case when the means 263 detects that the relationship between the discharge length and the effective length is altering, to the favour of the discharge length, for example when that relationship becomes 1.9 times the discharge length instead of the usual 1.8 times the discharge length. The result of the increase which then occurs in the width of the discharge orifice 220 is that a greater volume of material per unit of length passes through the discharge orifice 220, the wall thickness is thus increased, and the length of the tubular parison is correspondingly reduced. In the opposite case, if for example the aboveindicated relationship alters from 1.8 to 1.7, the signal from the comparison means 147 produces in the means 250 a change in the respective signal coming from the programmer 249, in such a manner as to reduce the width of the discharge orifice 220, with the result that a smaller volume of material per unit of length of the parison 233 passes through the discharge orifice 220, and a given volume is thus distributed over a greater length of parison. This change in the width of the discharge orifice 220 continues until the relationship which is preset in the comparison means 247 is restored to its initial value, for example 1.8.

Accordingly, this means that the dependency on the deviation from a predetermined relationship between the discharge length and the effective length of the parison 233 provides that the pattern or distribution in respect of wall thickness over the length of the parison or a part of that length, as defined by the program in the programmer 249, is spread out or contracted so that the alteration in the width of the discharge orifice 220, which is produced from a comparison between the discharge length and the effective length of the parison 233, produces a proportional alteration in the width of the discharge orifice which is predetermined on the basis of the program in respect of wall thickness. That is the function of the means 250, the output of which ultimately determines the position of the piston 227 and thus the core 217 of the discharge orifice 220.

With the apparatus shown in FIG. 3, it is possible for the wall thickness of the parison to be controlled with sufficient accuracy, by way of the width of the discharge orifice of the extrusion head, in such a way that the weight of the finished product is kept as close as possible to a predetermined desired or reference value. This is important for the reason that this is not readily possible in continuous extrusion as in such a process, in contrast to the embodiment shown in FIG. 1 wherein the parison 33 is extruded discontinuously, there is no accumulator chamber, the volume of which also determines the volume of the finished parison within close limits.

In all three illustrated embodiments, control of the programmer 49, 149, 249 in dependence on length provides considerable advantages over a control action which is dependent on volume or time, in particular by virtue of the fact that an alteration in the wall thickness of the parison, which is produced by a change in the setting of the wall thickness in the programmer, does not automatically result in displacement of all other points on the parison, which correspond to the switching points of the programmer. This is of considerable importance with regard to practical use, in particular for setting the programmer and for subsequently changing that setting.

Although it is known for the programmer to be controlled in dependence on length insofar as the forward movement of the free end of the tubular parison is used for controlling the programmer, using an arrangement for example corresponding to the means 167, 267, such a control mode involves a considerable amount of apparatus, whereas detecting the discharge length or discharge speed is comparatively simple, especially as the wheel 58, 158, 258 can easily bear against the extruded section and can be entrained thereby without producing harmful or unsightly marks on the extruded section. On the other hand, use of the means 167, 267 in the present invention permits the distribution in respect of wall thickness on the extruded section to be controlled with substantially greater accuracy so that the use of such means provides additional advantages which are not to be found in the state of the art. This applies in particular in regard to the embodiment shown in FIG. 3 as it permits the weight of the extruded section and thus the final product produced therefrom, to be kept to the desired or reference weight.

The means 167 or 267 can also be in the form of a stepless light detecting means which produces a varying analog signal, in accordance with the continuous movement of the extruded section.

Also, in any case, instead of the average value in respect of the relationships between the discharge length and the effective length of the extruded section, as referred to in connection with FIG. 2, it is possible for a function which for example in the form of a curve predetermines the variations in the relationships over the length of the parison for the comparison operation, to be introduced into the comparison means 147 or 247.

It will be appreciated that the above-described embodiments of the apparatus are given only by way of illustrative example and that various modifications and alterations may be made therein without thereby departing from the scope and spirit of the present invention.

What is claimed is:

1. In a method of producing an extruded section of thermoplastic material by extrusion through a discharge orifice of an extrusion head into which the plastic material passes through an inlet orifice from an extruder, the wall thickness of the extruded section being varied during extrusion in accordance with a given program, the improvement that the discharge length of the extruded section which passes through the discharge orifice is detected and the variation in wall thickness produced in accordance with said program is additionally controlled in dependence on said discharge length.

2. In a method of producing an extruded section of thermoplastic material by extrusion through a discharge orifice of an extrusion head into which the plastic material passes through an inlet orifice from an extruder, the wall thickness of the extruded section being varied during the extrusion operation in accordance with a given program, the improvement that the discharge speed of the extruded section on issuing from the discharge orifice is detected and the variation in wall thickness produced in accordance on said program is additionally controlled in dependence on said discharge speed and time.

3. A method as set forth in claim 1 wherein the discharge length of said extruded section on the one hand and the respectively associated effective length of the extruded section on the other hand are measured, the two values are compared together, and the wall thickness of the extruded section is subjected to additional correcting variations in dependence on the result of the comparison operation.

4. A method as set forth in claim 2 wherein the discharge speed of the extruded section on issuing from the discharge orifice on the one hand and the speed at which the free end of the extruded section advances on the other hand are measured, the two values are compared to each other, and the wall thickness of the extruded section is subjected to additional correcting variations in dependence on the result of said comparison operation.

5. A method as set forth in claim 3 wherein only the discharge length of the finished extruded section and the effective final length thereof are compared together.

6. A method as set forth in claim 3 wherein the discharge length of the extruded section and the associated effective length thereof are measured during the period of the extrusion operation and said two values are compared together.

7. A method as set forth in claim 4 wherein during the period of the extrusion operation said two speeds are detected and compared together.

8. A method as set forth in claim 3 wherein the width of said discharge orifice is varied to correct the length of the extruded section in dependence on the comparison result in respect of lengths.

9. A method as set forth in claim 4 wherein the width of said discharge orifice is varied to correct the length of the extruded section in dependence on the comparison result in respect of speeds.

10. A method as set forth in claim 3 wherein the length of said wall thickness program in the programmer is varied to adapt it to alterations in the relationships between said discharge length and said effective length in dependence on the result of said comparison.

11. A method as set forth in claim 4 wherein the length of said wall thickness program in the programmer is varied to adapt it to alterations in the relationships between said discharge speed and said effective speed in dependence on the result of said comparison.

12. A method as set forth in claim 1 or claim 2 wherein successive extruded sections are intermittently extruded.

13. A method as set forth in claim 1 or claim 2 wherein successive extruded sections are extruded continuously.

14. A method as set forth in claim 1 or claim 2 wherein the extruded section produced is tubular.

15. Apparatus for producing an extruded section of thermoplastic material comprising an extrusion head having an inlet orifice and a discharge orifice, a programming means for programming in respect of the wall thickness of the extruded section, and first measuring means for measuring the discharge length of the extruded section on leaving the extrusion head, said measuring means being connected to the programming means, thereby to influence performance of the program thereof.

16. Apparatus for producing an extruded section of thermoplastic material comprising an extrusion head having an inlet orifice and a discharge orifice, a programming means for programming in respect of the wall thickness of the extruded section, and first measuring means for measuring the discharge speed of the extruded section on leaving the extrusion head, said measuring means being connected to the programming means, thereby additionally to vary the wall thickness of the extruded section.

17. Apparatus as set forth in claim 15 and further including second measuring means for measuring the effective length of the extruded section, wherein the outputs of the first and second measuring means are connected to a means for detecting and evaluating the values from said measuring means, and wherein said detecting means is connected to a means for influencing the width of said discharge orifice.

18. Apparatus as set forth in claim 17 including a matching adjusting means having a first input connected to the output of the programming means, a second input connected to said detecting means, and an output connected to a controlling means for controlling the width of said discharge orifice.

19. Apparatus as set forth in claim 16 and further including second measuring means for measuring the speed of the free end of the extruded section, wherein the outputs of said first and second measuring means are connected to a means for detecting and evaluating the values from said measuring means, and wherein said detecting means is connected to a means for influencing the width of said discharge orifice.

20. Apparatus as set forth in claim 19 including a matching adjusting means having a first input connected to the output of the programming means, a second input connected to said detecting means, and an output connected to a controlling means for controlling the width of said discharge orifice.

21. Apparatus as set forth in claim 15 wherein said programming means has an output connected to a controlling means for controlling the width of the said orifice, and wherein connected to the input of said programming means is a means for detecting and evaluating the comparison values and for influencing the distribution of the program in respect of wall thickness over the length of said extruded section.

22. Apparatus as set forth in claim 16 wherein said programming means has an output connected to a controlling means for controlling the width of the said orifce, and wherein connected to the input of said programming means is a means for detecting and evaluating the comparison values and for influencing the distribution of the program in respect of wall thickness over the length of said extruded section.

23. A method of producing a tubular extruded section comprising: feeding material in a plastic condition into an extrusion head; extruding the material through a discharge orifice of the extrusion head; varying the wall thickness of the extruded section during extrusion thereof in accordance with a given program; measuring at least one factor of the group of operating factors comprising the discharge length and the discharge speed of the extruded section as it passes through the discharge orifice; and additionally controlling the programmed variation in wall thickness in dependence on the result of measuring said at least one factor.

24. A method as set forth in claim 23 which further comprises measuring at least one of the factors of a second group of operating factors comprising the speed at which the free end of the extruded section advances and and the effective length of the extruded section, comparing said at least one measured factor of said first-mentioned group to said at least one measured factor of said second group, and applying corrective variation to the wall thickness of the extruded section in dependence on said comparison.

* * * * *